(12) United States Patent
Truong (10) Patent No.: US 10,755,603 B1
(45) Date of Patent: Aug. 25, 2020

(54) COLOR-CODED INSTRUCTIONAL WIGS FOR TEACHING BRAIDING TECHNIQUES

(71) Applicant: Styles Down The Aisle, Inc., Chicago, IL (US)

(72) Inventor: Laetitia Truong, Chicago, IL (US)

(73) Assignee: Styles Down the Aisle, Inc., Chicago, IL (US)

( * ) Notice: Subject to any disclaimer, the term of this patent is extended or adjusted under 35 U.S.C. 154(b) by 0 days.

(21) Appl. No.: 16/538,770

(22) Filed: Aug. 12, 2019

(51) Int. Cl.
*G09B 19/10* (2006.01)
*G09B 25/00* (2006.01)
*G09B 19/00* (2006.01)
*A41G 3/00* (2006.01)

(52) U.S. Cl.
CPC .............. *G09B 25/00* (2013.01); *A41G 3/00* (2013.01); *G09B 19/00* (2013.01)

(58) Field of Classification Search
USPC ............... 434/94, 95, 96, 97, 247, 258, 260; 446/296
See application file for complete search history.

(56) References Cited

U.S. PATENT DOCUMENTS

| | | | | |
|---|---|---|---|---|
| 2,585,946 A * | 2/1952 | Liberman | ................ | D05B 1/02 434/95 |
| 3,458,943 A * | 8/1969 | Trowbridge | ........... | A45D 44/14 434/94 |
| 3,930,331 A * | 1/1976 | Simeone | ................ | A63H 3/02 446/369 |
| 4,370,137 A * | 1/1983 | Herzig | ................ | A45D 44/005 434/94 |
| 4,403,962 A * | 9/1983 | La Vista | ................ | G09B 25/00 434/94 |
| 4,810,196 A * | 3/1989 | Walker | ................ | A45D 44/14 434/270 |
| 4,874,676 A * | 10/1989 | Miller | ................ | A63H 3/44 428/542.2 |
| 5,240,418 A * | 8/1993 | Silverman | ........... | G09B 19/0076 36/112 |
| 6,638,133 B1 * | 10/2003 | Brancolino | ............. | A63H 3/52 132/275 |
| 7,410,358 B2 * | 8/2008 | Morehead | ............. | A63H 3/365 434/94 |
| 8,262,392 B2 * | 9/2012 | Kubo | ................ | G09B 23/34 434/94 |
| 8,602,835 B1 * | 12/2013 | Zwiers | ................ | A63H 3/44 446/394 |
| 2003/0175663 A1 * | 9/2003 | Fuchs | ................ | G09B 19/00 434/94 |
| 2006/0008780 A1 * | 1/2006 | Pang | ................ | G09B 19/00 434/94 |
| 2006/0141900 A1 * | 6/2006 | Wesley | ................ | A63H 3/44 446/394 |
| 2013/0017758 A1 * | 1/2013 | Cooper | ................ | A01K 15/025 446/490 |

* cited by examiner

Primary Examiner — Kurt Fernstrom
(74) Attorney, Agent, or Firm — K&L Gates LLP (57) ABSTRACT

The color-coded instructional wig system includes a wig cap configured to cover at least a portion of a scalp, wherein the wig cap includes an inner surface for contacting the scalp and an outer surface, a plurality of hair segments extending from the outer surface of the wig body, wherein each hair segment is a different color than the adjacent hair segment, and a style instruction including a plurality of steps for a user to perform to result in a final braided hair style.

11 Claims, 6 Drawing Sheets

COLOR-CODED INSTRUCTIONAL WIGS FOR TEACHING BRAIDING TECHNIQUES

BACKGROUND OF THE INVENTION

The present subject matter relates generally to color-coded instructional wigs used to teach techniques for braiding hair. More specifically, the present subject matter provides a wig having uniquely color-coded hair segments that, in combination with a corresponding instruction set, assist in teaching and learning various braiding techniques.

There are many hairstyling techniques. However, braiding is the most popular learned style. It is learned by children, mothers and fathers with daughters, and hairstyling professionals. Braiding has many complicated variations, each a unique style, but many people fail to learn even the most basic braid. It is not simple to learn, nor is it simple to teach, in part because it can be confusing how one combines strands of hair to create a braid. Of the many braiding techniques, there are those that use two strands, three strands, four strands, five strands, or more. In addition to the number of strands, braiding variations include upside down versus right side up, variations of waterfall braids, stacked braids, and many more.

Braiding can be as simple as a common three-strand braid technique or more complicated, such as a five-strand braid, and a significant amount of practice is required to be proficient in braiding, particularly to master all of the variations of braiding. For practice, hairstyling professionals commonly use mannequin heads and children commonly use their life size dolls. While useful, these practice tools are not well-adapted to optimally teach braiding techniques.

Accordingly, there is a need for a color-coded braiding cap system to provide hands on braiding education that may be adapted for use for all variations of braiding for hairstyling professionals, parents, and children to improve their confidence in learning and retaining various braiding techniques.

BRIEF SUMMARY OF THE INVENTION

The present disclosure provides a color-coded instructional wig cap for learning how to braid successfully. Various examples of the system are provided herein.

As described further herein, a color-coded wig cap can be placed on mannequin heads or dolls to aid in learning braiding. In addition, color-coded wig caps can be placed on top of a person's head to learn how to braid. Once the technique is learned, the wig caps can be removed and the braiding practice may continue on a mannequin head, a doll, or a person's head.

In one example, the present system includes an instructional wig cap and accompanying style instructions. The instructional wig cap can include a plurality of hair segments extending from an outer surface of a wig body, wherein each hair segment is color-coded to help visually instruct a user how to separate and weave the hair into the intended braided form. The braiding instructions instruct the user how to hold and manipulate each of the color-coded hair segments to perform the proper braiding technique.

The use of color-coded hair segments aid a user to visually identify how to separate the hair into the necessary strands. Most importantly, it simplifies the communication of the braiding instructions as each hair segment is referenced by color (e.g., "next, move the red strand over the blue strand"). A user can then very quickly visually identify how to separate, hold, and manipulate each hair segment to practice the braiding technique and guaranteeing learning success.

There may be variations of the color-coded instructional wig cap that provide instructions for each type of braiding technique, such as, for example, two or more strand braids, stacked braids, waterfall braids, etc. The number of hair segments, the corresponding number of colors used, and the location of each hair segment may vary from wig cap to wig cap to more optimally teach each braiding technique.

In some examples, each color-coded instructional wig cap may be dedicated to teaching a single braiding technique. Such wig caps may include one or more groupings of color-coded hair segments. In other examples, a single wig cap may include several groupings of color-coded hair segments such that it may be used to teach a number of various braiding techniques.

In one example, an instructional wig system includes: a wig cap that when worn by a person covers at least a portion of a scalp, wherein the wig cap includes an inner surface that contacts the scalp when worn and an outer surface; at least three hair segments extending from the outer surface of the wig body, wherein at least three of the hair segments are a different color; and a style instruction set including a plurality of style instruction steps for a user to perform to result in a braided final hair style, wherein each style instruction step communicates an order dependent user action to be taken with respect to one or more of the hair segments using color to identify the hair segment with which to perform the user action.

The plurality of style instruction steps may include images and text. In one example, the at least three hair segments may include five right side hair segments extending from a right side of the wig cap, five left side hair segments extending from a left side of the wig cap, and three crown hair segments extending from a crown portion of the wig cap. The right side hair segments may be alternating tones of a first color and the left side hair segments may be alternating tones of a second color. The three crown hair segments may each be a different color. In other example, the at least three hair segments may include a first set of four differently colored hair segments and a second set of four differently colored hair segments, wherein the first set of four differently colored hair segments uses the same four colors as the second set of four differently colored hair segments.

In another embodiment, the instructional wig system includes: a wig cap that when worn by a person covers at least a portion of a scalp, wherein the wig cap includes an inner surface that contacts the scalp when worn and an outer surface; a plurality of hair segments, each including a plurality of hair strands, extending from the outer surface of the wig body including five right side hair segments extending from a right side of the wig cap in alternating tones of a first color, five left side hair segments extending from a left side of the wig cap in alternating tones of a second color, and three crown hair segments extending from a crown portion of the wig cap in a third, fourth, and fifth color; and a style instruction set including color images and text and further including a plurality of style instruction steps for a user to perform to result in a braided final hair style, wherein each style instruction step communicates an order dependent user action to be taken with respect to one or more of the hair segments using color to identify the hair segment with which to perform the user action.

In another embodiment, the instructional wig system includes: a wig cap that when worn by a person covers at least a portion of a scalp, wherein the wig cap includes an inner surface that contacts the scalp when worn and an outer surface; a plurality of hair segments, each including a plurality of hair strands, extending from the outer surface of the wig body including a first set of four differently colored hair segments and a second set of four differently colored hair segments, wherein the first set of four differently colored hair segments uses the same four colors as the second set of four differently colored hair segments; and a style instruction set including a plurality of style instruction steps for a user to perform to result in a braided final hair style, wherein each style instruction step communicates an order dependent user action to be taken with respect to one or more of the hair segments using color to identify the hair segment with which to perform the user action.

An advantage of the present system is providing an easy to follow learning system for variations of braids owing to the different color-coded hair sections in combination with an instructional tutorial.

An additional advantage of the present system is that it provides a hands-on teaching platform including instructions and a color-coded wig cap corresponding to the instructions.

A third advantage of the present system is that one wig cap can be used for practicing a plurality of braided hairstyle tutorials.

A fourth advantage of the present system is for hairstyling professionals and non-professionals to use the color-coded wig caps to practice styling braiding techniques on mannequin heads, doll heads or a person's head.

A fifth advantage of the present system is providing a visual instruction to aid in the learning of braiding. When the instructed techniques are applied, using the color-coded pattern of hair segments on the instructional wig cap, they result in a braided hair style.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE INVENTION

The present instructional wig system includes a wig having a plurality of color-coded hair segments that can be manipulated into a final braided hair style using a set of corresponding style instructions.

Figure 1A:
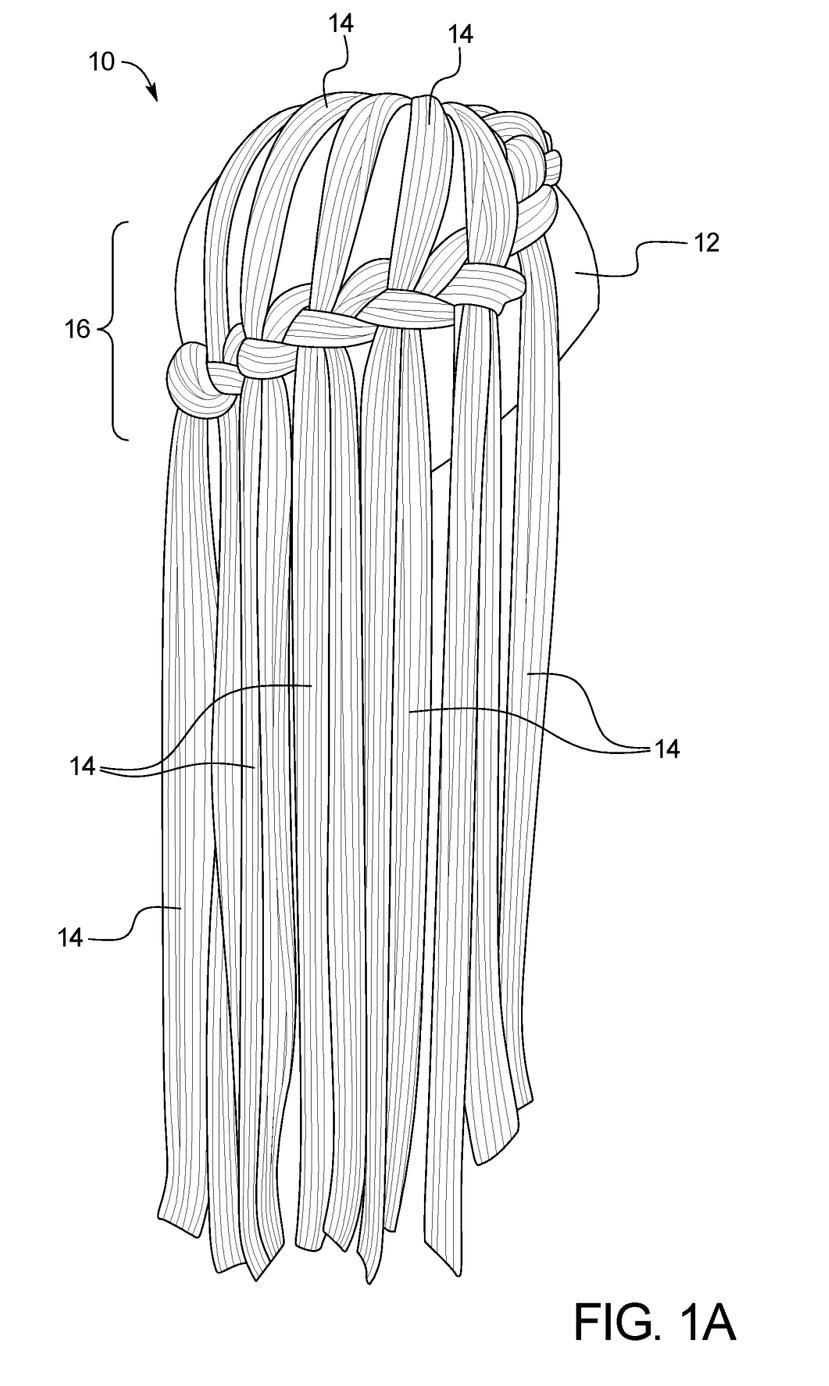
FIGS. 1A-1B are perspective views of an example of a color-coded instructional wig cap for teaching a braiding technique.
Figure 1B:
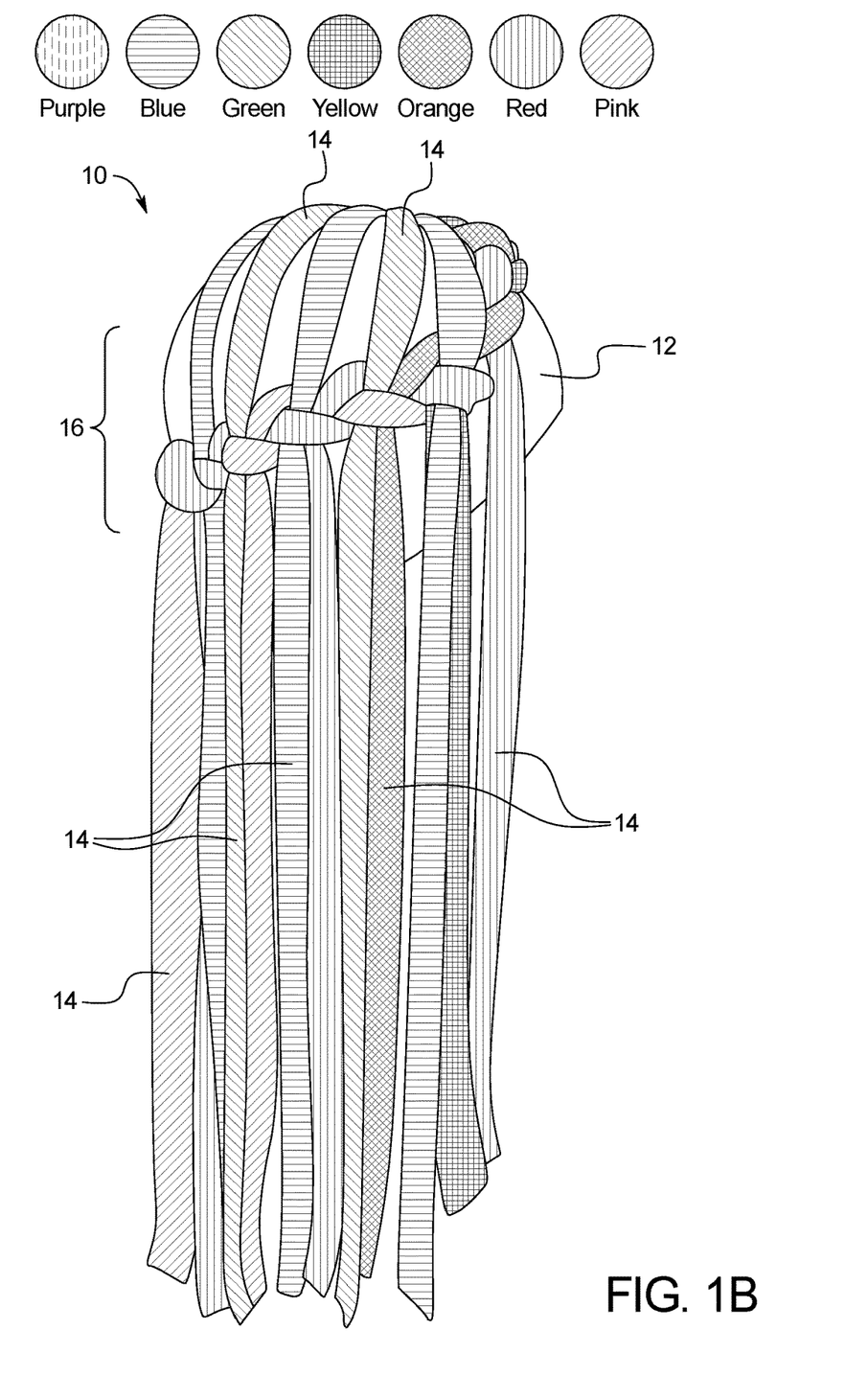

As shown in FIGS. 1A-1B, a color-coded instructional wig system 10 can include a wig cap 12 (e.g., cap) with a plurality of colored hair segments 14 extending from the outer surface of the wig cap 12. The inner surface of the wig cap 12 can be placed on a mannequin or a person's head. The wig cap 12 can include one or more attachment mechanisms, such as clips, adhesive, snaps, or any other suitable attachment to help hold the wig cap 12 in place on the mannequin or a person's head. Alternatively, or in addition to, the inner surface of the wig cap 12 can be composed of a material (e.g., rubber, other polymeric material) that removeably sticks to the surface of a mannequin head without the use of adhesives or other attachment mechanisms.

The example shown in FIGS. 1A and 1B is two depictions of the same color-coded instructional wig system 10. As shown in FIG. 1A, each of the plurality of colored hair segments 14 includes a number of individual hair strands. As shown in FIG. 1B, each of the plurality of colored hair segments 14 is color coded, as represented by the color legend shown in FIG. 1B, so to make it easier for a user to follow the instructions provided. While only shown in FIG. 1B, the color legend shown in FIG. 1B applies to all of the figures in this disclosure. In each of the examples shown in FIGS. 2A-2C, 3A-3E, and 4A-4G, the plurality of colored hair segments 14 are shown only according to their color coding, but it is important to note that each of the plurality of colored hair segments 14 in FIGS. 2A-2C, 3A-3E, and 4A-4G is also constructed such that each includes a number of individual hair strands.

Figure 2A:
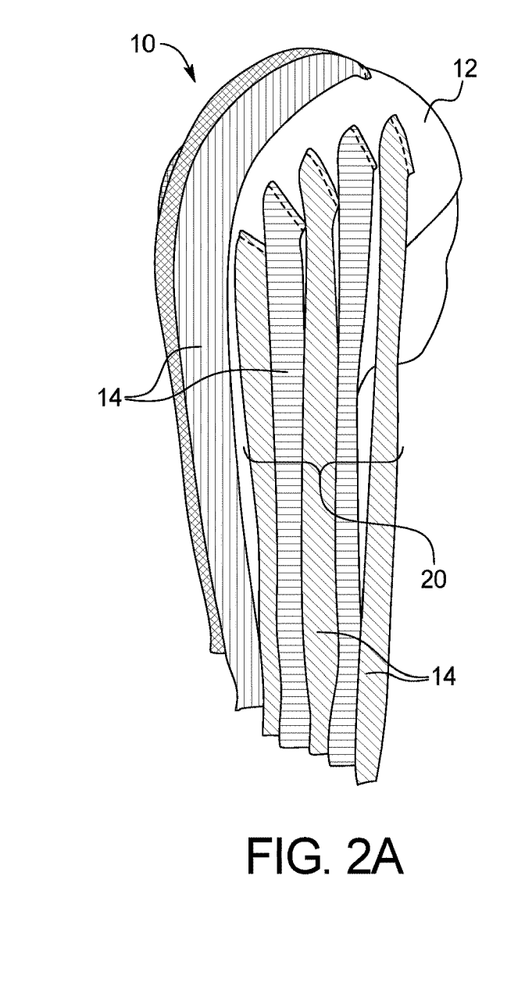
FIGS. 2A-2C are perspective views of an example of the instructional wig cap in a before a final hair style.
Figure 2B:
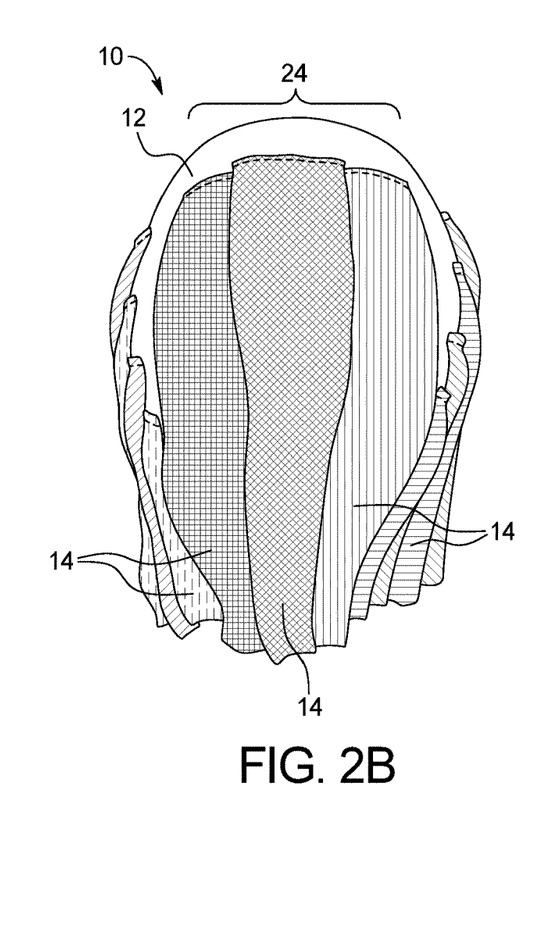
Figure 2C:
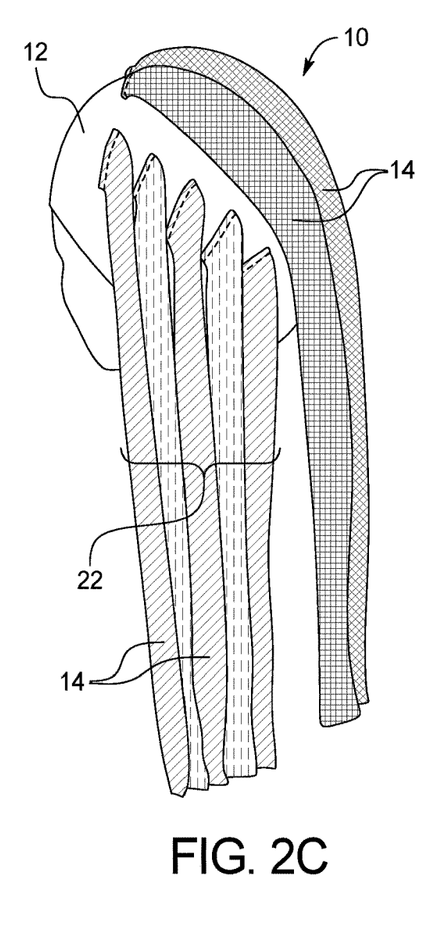
Figure 3A:
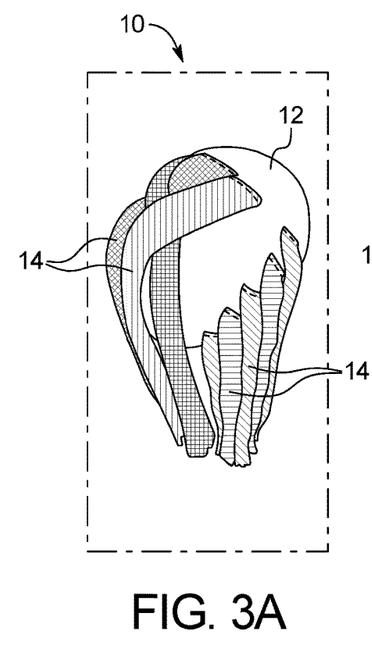
FIGS. 3A-3E are perspective views of an example of a style instruction for the instructional wig in a final hair style.
Figure 3B:
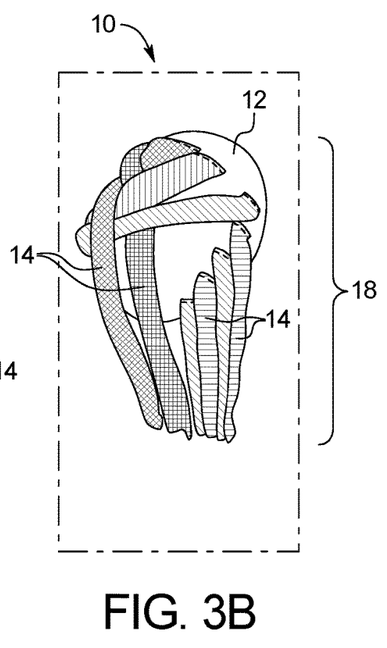
Figure 3C:
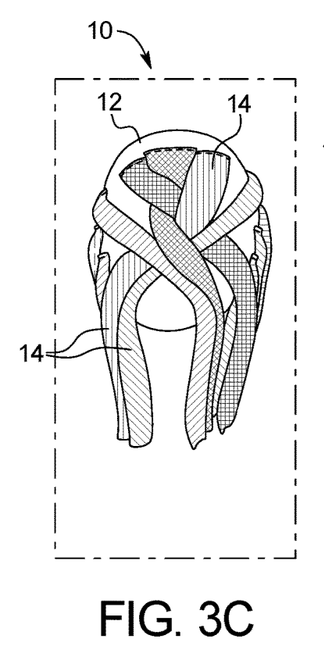
Figure 3D:
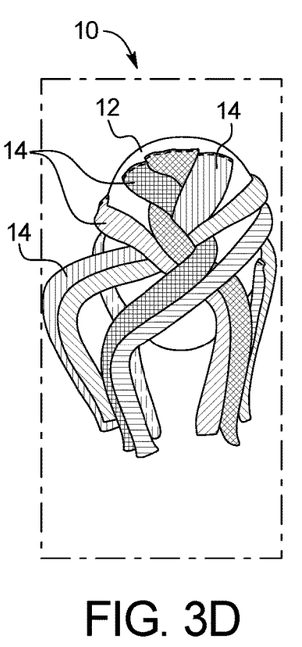
Figure 3E:
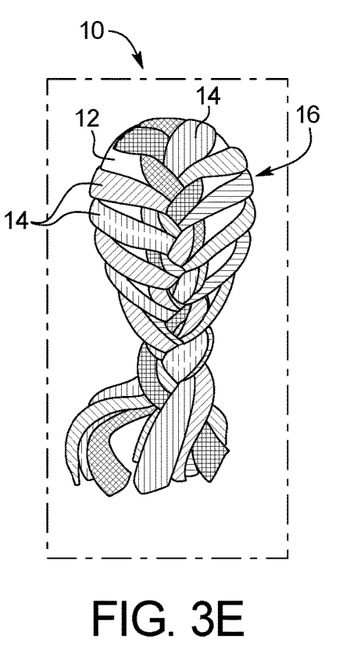

FIGS. 2A-2C illustrate an example of a wig system 10 for teaching a French braid technique. As shown in FIGS. 2A-2C, the wig cap 12 can include right side hair segments 20, left side hair segments 22, and crown hair segments 24. The right side hair segments 20 and the left side hair segments 22 can be positioned along the hair line from the temple area to the base of the back of the neck. In an example, the right side hair segments 20 and the left side hair segments 22 can include between four to ten segments each. The crown hair segments 24 can be positioned laterally along the width of the crown. In an example, the crown hair segments 24 can include two to five segments.

The hair segments 14 can be any suitable colors. In an example, the right side hair segments 20 have a first color scheme, left side hair segments 22 have a second color scheme, and the crown hair segments 24 have a third color scheme. The color schemes can be different shades of different shades of one colors, complimentary colors, analogous colors, triadic colors, primary colors, among others. The placement of each hair segment and the color of each hair segment is critical for the successfully teaching the final braided hair style.

In the example shown in FIGS. 2A-2C, the right side hair segments 20 are alternating tones of a first color (i.e., alternating between a first and second tone of blue), the left side hair segments 22 are alternating tones of a second color (i.e., alternating between a first and second tone of purple), and the crown hair segments 24 are three independent colors (i.e., yellow, orange, and red).

The hair segments 14 can be made of any suitable material including, but not limited to, hair, synthetic fibers, yarn, thread, among other materials. Each hair segment 14 can be a different color than the adjacent hair segments 14. In such example, colors may be repeated while adjacent hair segments 14 are different colors. In another example, every hair segment 14 is a different color than all of the other hair segments 14.

By providing multiple colors of hair segments 14, a hair stylist can follow the associated color-coded style instructions to braid the hair and produce a final braided hair style 16. The style instructions illustrate a plurality of steps including exactly which hair segment 14 to select and move relative to the other hair segments 14 to produce the final hair style 16.

In an example, one instructional wig system 10 having a pattern of color specific hair segments 14 produces one final hair style 16, wherein the final hair style 16 is a braided hair style. For example, the system 10 can include a plurality of instructional wigs each having an associated style instruction 18 to produce a final hair style 16, wherein the final hair style 16 is a braided hair style.

Alternatively, or in addition to, a single instructional wig system 10 having a specific pattern of color-coded hair segments 14 may be used practice a plurality of braided hair styles 16 based on a plurality of associated style instructions 18.

The system 10 can include a mannequin head with the instructional wig already attached. The hair segments 14 can be attached to the outer surface of the wig cap 12 by any conventional means. For example, the root ends of the hair segments can be weaved onto a warp of threads, wherein the wefts are sewn to a foundation on the wig cap 12. In an example, the wefts can be glued to the wig cap 12.

Alternatively, or in addition to, the hair segments 14 can be attached to the outer surface of the wig cap 12 in the form of tracks (e.g., extensions) sewn to the wig cap 12. In an example, instead of being sew into the wig cap 12, the tracks can be removeably attached to the outer surface of the wig cap 12. The outer surface of the wig cap 12 can include a plurality of hair segment receiving sections. For example, the instructions can direct the user to attach specific hair segments 14 to specific hair segment receiving sections. As a result, the system 10 can include one instructional wig cap 12 with a plurality of attachable hair segments 14 to produce a plurality of hair styles 16, each hair style corresponding to a particular style instruction 18. In an example, each hair segment 14 is a hair extension that can be removeably attached to the outer surface of the instructional wig cap 12.

As shown in FIG. 3A-3E, the style instructions 18 can be in any format including, but not limited to, written instructions, audio instructions, hard copy instructions (e.g., printed instructions), electronic instructions, video tutorials, image-based lists, among others. In an example, the style instruction 18 can include a plurality of sequential images to direct the user step by step to create the final braided hair style 16.

For example, as shown in FIGS. 3A-3E, the associated style instruction 18 may be written and/or illustrated instructions for how and when to manipulate each hair segment 14. Such written instructions for FIGS. 3A-3E may be as follows:

"As shown, there are five left side strands in alternating lighter and darker purple, there are five right side strands in alternating lighter and darker blue, and there are three crown hair segments that are, from left to right, yellow, orange, and red. First, weave the yellow strand to the right going above the orange and below the red. Next, weave the topmost blue strand to the left going over the yellow and below the orange. Next, pair the top most lighter purple strand with the orange and weave the pair to the right, over the red and lighter blue and below the yellow and darker blue. There are now three pairs of strands, from left to right, red and light blue, yellow and dark blue, and orange and light purple. Now treat these pairs as the initial three crown hair segments and repeat the pattern until all of the purple and blue strands have been woven into the braid."

Figure 4A:
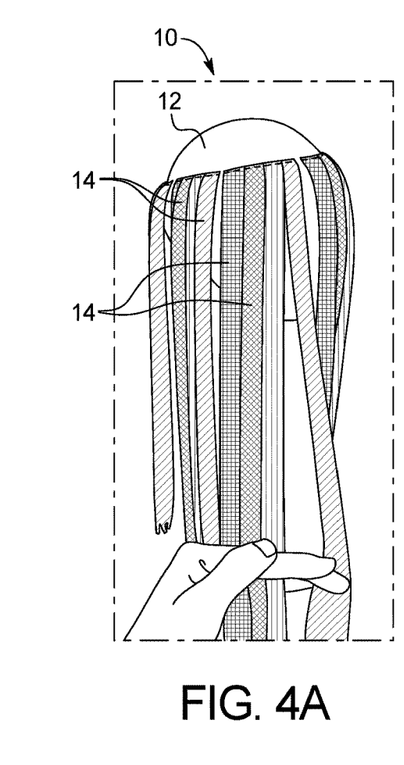
FIGS. 4A-4G are perspective views of an example of a style instruction for the instructional wig progressing to the final hair style.
Figures 4B, 4C, 4D:
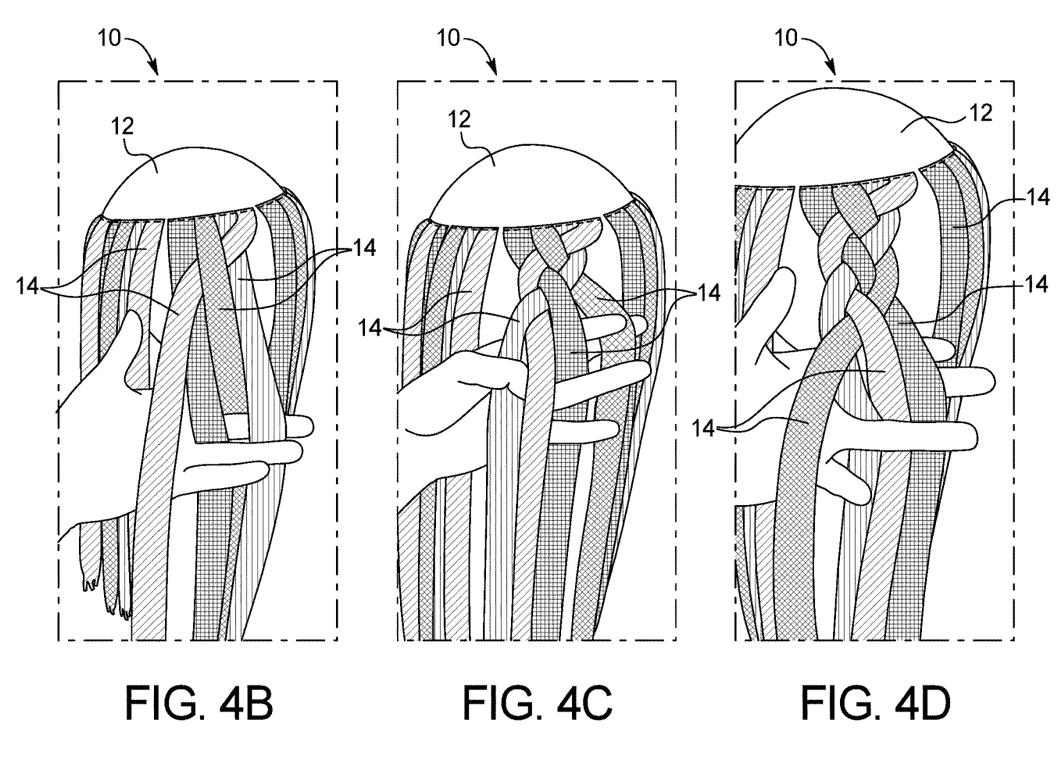
Figure 4E:
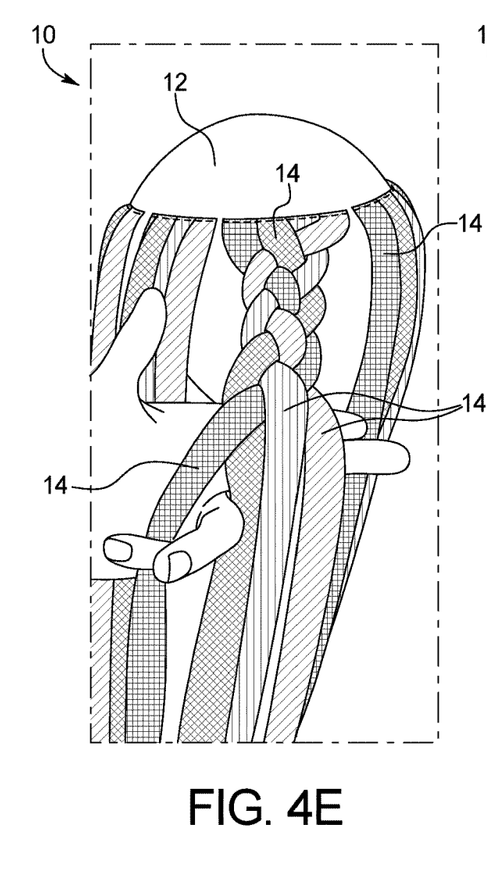
Figure 4F:
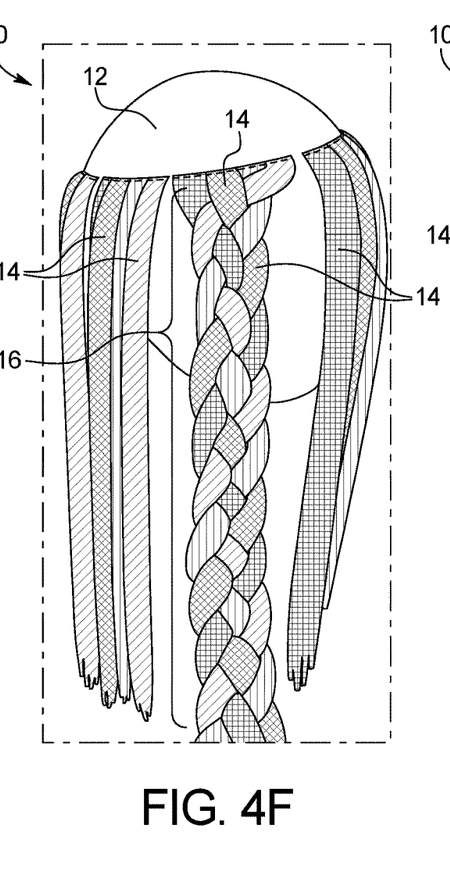
Figure 4G:
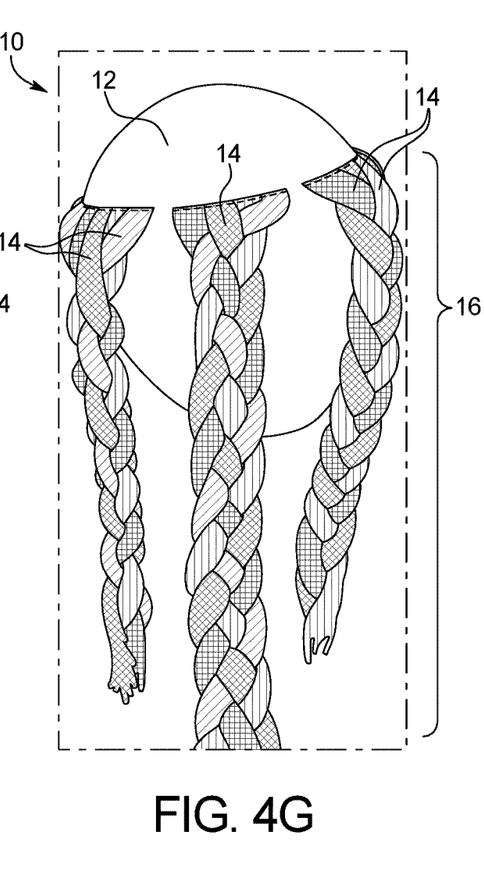

FIGS. 4A-4G give another example of the style instructions 18 for a to result in a four stranded braid final hair style 16. In such example, the wig cap 12 can include a plurality of linearly aligned hair segments 14, wherein the hair segments 14 can be groups of four hair segments 14, each hair segment in the group of four having a different color. In the example, the final hair style 16 can be one to three four-stranded braids. The style instructions 18 can include a plurality of images illustrating a step by step method to result in the final hair style, as shown in FIG. 4G. The style instructions 18 can include text instructions corresponding to each step in the styling process. For example, the instructions can state, "The pink strand on the far right goes above the red strand immediately to its left, then under the orange strand to the left of the red strand, and then above the yellow stand on the far left." The instructions can include text corresponding to the overall process. Alternatively, or in addition to, the style instructions can include textual instruction for each image step.

The following is an example of a set of instructions that may accompany FIGS. 4A-4G:

"As shown, there are three sets of four strands. Within each set, each strand is a different color. From left to right, the strands are yellow, orange, red, and pink. First, weave the rightmost pink strand to the left going above the red, below the orange, and above the yellow. There is now a new order of strands, from left to right, pink, yellow, orange, and red. Next, weave the rightmost red strand to the left going above the orange, below the yellow, and above the pink. The new order, from left to right, is red, pink, yellow, and orange. Next, weave the rightmost orange strand to the left going above the yellow, below the pink, and above the red. The new order, from left to right, is orange, red, pink, and yellow. Next, weave the rightmost yellow strand to the left going above the pink, below the red, and above the orange. This completes a full rotation returning the order of the strands to the original order: yellow, orange, red, and pink. Repeat until desire length is completed."

It should be noted that various changes and modifications to the embodiments described herein will be apparent to those skilled in the art. Such changes and modifications may be made without departing from the spirit and scope of the present invention and without diminishing its attendant advantages. For example, various embodiments of the systems and methods may be provided based on various combinations of the features and functions from the subject matter provided herein.

I claim:

1. An instructional wig system comprising:
a wig cap that when worn by a person covers at least a portion of a scalp, wherein the wig cap includes an inner surface that contacts the scalp when worn and an outer surface;
at least three hair segments extending from the outer surface of the wig body, wherein at least three of the hair segments are a different color; and
a style instruction set including a plurality of style instruction steps for a user to perform to result in a braided final hair style, wherein each style instruction step communicates an order dependent user action to be taken with respect to one or more of the hair segments using color to identify the hair segment with which to perform the user action, wherein the at least three hair segments includes five right side hair segments extending from a right side of the wig cap, five left side hair segments extending from a left side of the wig cap, and three crown hair segments extending from a crown portion of the wig cap.

2. The system of claim 1, wherein the plurality of style instruction steps includes images.

3. The system of claim 1, wherein the plurality of style instruction steps includes text.

4. The system of claim 1, wherein the right side hair segments are alternating tones of a first color, wherein the left side hair segments are alternating tones of a second color.

5. The system of claim 4, wherein the alternating shades of the first color are dark blue and light blue and the alternating shades of the second color are dark purple and light purple.

6. The system of claim 1, wherein the three crown hair segments are each a different color.

7. The system of claim 6, wherein each of the three crown hair segments is a different color from each of the right side hair segments and each of the left side hair segments.

8. The system of claim 1, wherein the at least three hair segments includes a first set of four differently colored hair segments and a second set of four differently colored hair segments, wherein the first set of four differently colored hair segments uses the same four colors as the second set of four differently colored hair segments.

9. The system of claim 8, wherein the four differently colored hair segments are pink, red, yellow, and orange.

10. An instructional wig system comprising:

a wig cap that when worn by a person covers at least a portion of a scalp, wherein the wig cap includes an inner surface that contacts the scalp when worn and an outer surface;

a plurality of hair segments, each including a plurality of hair strands, extending from the outer surface of the wig body including five right side hair segments extending from a right side of the wig cap in alternating tones of a first color, five left side hair segments extending from a left side of the wig cap in alternating tones of a second color, and three crown hair segments extending from a crown portion of the wig cap in a third, fourth, and fifth color; and a style instruction set including color images and text and further including a plurality of style instruction steps for a user to perform to result in a braided final hair style, wherein each style instruction step communicates an order dependent user action to be taken with respect to one or more of the hair segments using color to identify the hair segment with which to perform the user action.

11. An instructional wig system comprising:

a wig cap that when worn by a person covers at least a portion of a scalp, wherein the wig cap includes an inner surface that contacts the scalp when worn and an outer surface;

a plurality of hair segments, each including a plurality of hair strands, extending from the outer surface of the wig body including a first set of four differently colored hair segments and a second set of four differently colored hair segments, wherein the first set of four differently colored hair segments uses the same four colors as the second set of four differently colored hair segments; and a style instruction set including a plurality of style instruction steps for a user to perform to result in a braided final hair style, wherein each style instruction step communicates an order dependent user action to be taken with respect to one or more of the hair segments using color to identify the hair segment with which to perform the user action.

* * * * *